March 16, 1926.    1,577,260
J. M. JONES
CAR WHEEL
Filed June 27, 1925
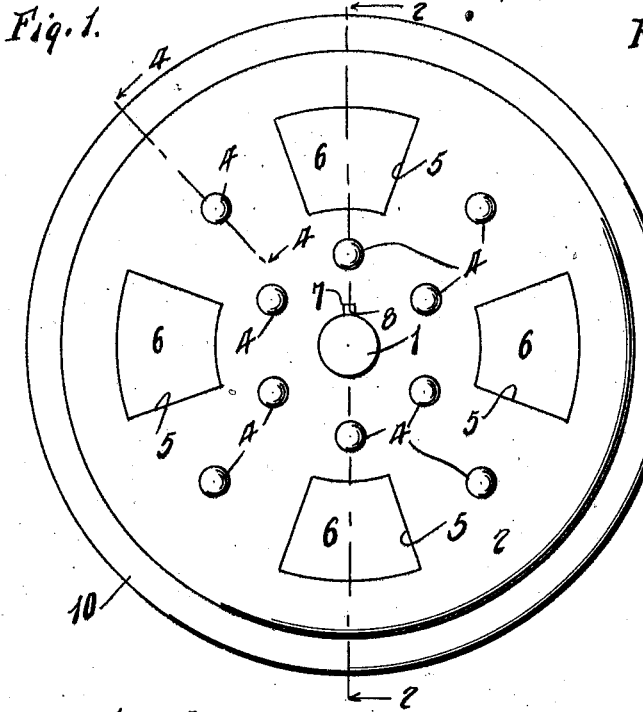
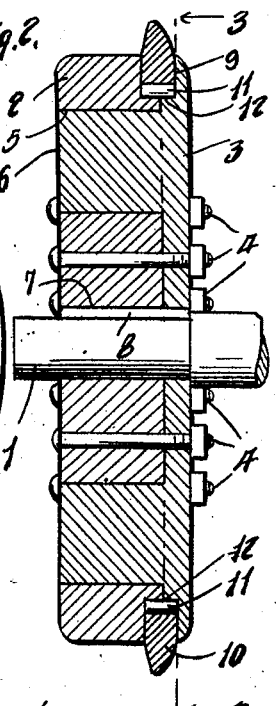
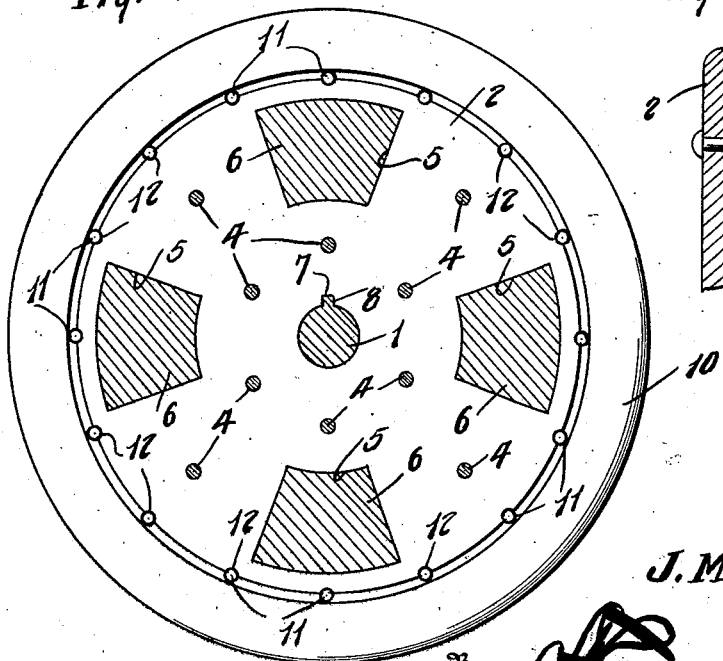
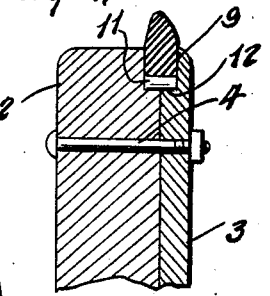
Inventor
J. M. Jones,
By
Attorney Patented Mar. 16, 1926.

1,577,260

UNITED STATES PATENT OFFICE.

JAMES M. JONES, OF HAMILTON, OHIO.

CAR WHEEL.

Application filed June 27, 1925. Serial No. 39,981.

*To all whom it may concern:*

Be it known that I, JAMES M. JONES, a citizen of the United States, residing at Hamilton, in the county of Butler and State of Ohio, have invented certain new and useful Improvements in Car Wheels; and I do hereby declare the following to be a full, clear, and exact description of the invention, such as will enable others skilled in the art to which it appertains to make and use the same.

The invention relates to wheels for railway cars and other vehicles using a track, and has for its object the improvement of wheels to the end that the flange is a separate structure from the wheel and is rotatably mounted in a groove formed in the tread of the wheel so that the flange is capable of moving independently of the rotation of the wheel to obviate derailing by the flange climbing the side of the rail in rounding curves and in sections of the track where the rails have for any reason moved into a position narrowing the gauge.

The construction and operation of the invention as well as its advantages will be described in detail hereinafter and the improved construction of car wheel will be found illustrated in the accompanying drawings, in which—

Figure 1 is a side view in elevation of the improved car wheel,

Figure 2 is a horizontal sectional view on a plane indicated by the line 2—2 of Figure 1, Figure 3 is a section taken on a plane indicated by the line 3—3 of Figure 2, and Figure 4 is a detail sectional view on a plane indicated by the line 4—4 of Figure 1.

In the drawings similar reference characters will be used to designate corresponding parts throughout the several views.

A car axle is shown at 1 on which is mounted the improved construction of car wheel, said wheel being of a composite type and made up of two sections designated respectively 2 and 3 that are held together by means of a plurality of bolts and nuts 4.

Section 2 is provided with a plurality of openings 5 and section 3 with a similar number of lateral projections 6 conforming in their shape to the openings 5. Each of the sections 2 and 3 is provided with a spline 7 that engages the feather 8 on axle 1, or any other suitable means may be provided to secure the wheel on the axle 1 for rotation therewith. Each of sections 2 and 3 are provided with mating recesses that combine when the wheel is assembled to form a groove 9, and 10 indicates an annulus that is mounted relatively to the wheel in said groove 9 and projecting beyond the tread of the wheel to form the wheel flange that is formed tapered outwardly as shown. 11 indicates anti-friction bearings that are preferably cylindrical as shown in the drawings and engaging recesses 12 in the base of the groove 9 and the inner surface of the annulus 10.

It will be readily understood that as the annulus 10, forming the flange for the car wheel, is movable relatively to the tread of the wheel that such structure will as heretofore stated prevent the wheel climbing the rail in rounding curves, and in sections of the track where the gauge may be narrower than the standard gauge.

What is claimed is:—

1. A car wheel made of detachable sections, each of said sections having a recess therein adapted to cooperate with one another to form a circumferential groove, and an annulus mounted in said groove and movable relatively to the wheel, said annulus extending outwardly of the wheel tread and forming a flange.

2. A composite car wheel formed of mating sections, one of said sections having projections extending laterally from one of its faces, the other section having openings therein to snugly receive said projections, the abutting faces of said sections having recesses therein forming a circumferential groove in the tread of the wheel, and an annulus mounted in said groove and rotatable relatively to the wheel tread, said annulus projecting beyond the periphery of the wheel and forming a flange therefor.

3. A composite car wheel formed of mating sections, one of said sections having projections extending laterally from one of its faces, the other section having openings therein to snugly receive said projections, the abutting faces of said sections having recesses therein forming a circumferential groove in the tread of the wheel, an annulus mounted in said groove and rotatable relatively to the wheel tread, said annulus projecting beyond the periphery of the wheel and forming a flange therefor, and antifriction bearings between the inner face of the annulus and the base of the groove.

In testimony whereof I affix my signature.

JAMES M. JONES.